United States Patent
Li et al.

(10) Patent No.: US 10,706,814 B2
(45) Date of Patent: Jul. 7, 2020

(54) PROCESSING METHOD AND PROCESSING DEVICE FOR DISPLAY DATA, AND DISPLAY DEVICE

(71) Applicants: Beijing BOE Optoelectronics Technology Co., Ltd., Beijing (CN); BOE Technology Group Co., Ltd., Beijing (CN)

(72) Inventors: Yafei Li, Beijing (CN); Bo Gao, Beijing (CN); Yue Li, Beijing (CN); Wei Sun, Beijing (CN); Hao Zhang, Beijing (CN); Lingyun Shi, Beijing (CN); Tiankuo Shi, Beijing (CN); Xiurong Wang, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/207,988

(22) Filed: Dec. 3, 2018

(65) Prior Publication Data
US 2019/0272801 A1    Sep. 5, 2019

(30) Foreign Application Priority Data

Mar. 1, 2018    (CN) .......................... 2018 1 0171542

(51) Int. Cl.
*G09G 5/00* (2006.01)
*G06F 3/01* (2006.01)
*G09G 5/377* (2006.01)

(52) U.S. Cl.
CPC .............. *G09G 5/006* (2013.01); *G06F 3/013* (2013.01); *G09G 5/377* (2013.01); *G09G 2320/0252* (2013.01); *G09G 2340/02* (2013.01); *G09G 2340/0407* (2013.01); *G09G 2340/10* (2013.01);
(Continued)

(58) Field of Classification Search
None
See application file for complete search history.

(56) References Cited

U.S. PATENT DOCUMENTS 4,790,028 A * 12/1988 Ramage .............. G06F 3/04845
382/298
10,401,952 B2 * 9/2019 Young ..................... G06F 3/013
(Continued)

FOREIGN PATENT DOCUMENTS

CN        104767992 A    7/2015
CN        107317987 A    11/2017

OTHER PUBLICATIONS

First Office Action and English language translation, CN Application No. 201810171542.3, dated Nov. 29, 2019, 25 pages.

*Primary Examiner* — Motilewa Good Johnson
(74) *Attorney, Agent, or Firm* — Myers Bigel, P.A.

(57) ABSTRACT

An aspect of the disclosure provides a processing method for display data applied in a computing device, which processing method includes: determining a region of interest in the display area of the computing device; compressing data of an image in the display area; and transmitting data of an image of the region of interest and the compressed image data in the display area. The disclosure further provides a corresponding processing device and display device.

19 Claims, 7 Drawing Sheets

(52) U.S. Cl.
CPC ..... *G09G 2350/00* (2013.01); *G09G 2354/00* (2013.01); *G09G 2370/00* (2013.01)

(56) References Cited

U.S. PATENT DOCUMENTS

| | | | |
|---|---|---|---|
| 2006/0271612 A1* | 11/2006 | Ritter | G02B 27/0093 |
| | | | 708/203 |
| 2011/0287811 A1* | 11/2011 | Mattila | G06K 9/4671 |
| | | | 455/566 |
| 2016/0274365 A1* | 9/2016 | Bailey | G02B 27/0093 |
| 2017/0285736 A1* | 10/2017 | Young | G06F 3/013 |
| 2017/0287446 A1* | 10/2017 | Young | G09G 5/391 |
| 2018/0136720 A1* | 5/2018 | Spitzer | G06F 3/013 |
| 2018/0137598 A1* | 5/2018 | Spitzer | G06T 1/20 |
| 2018/0137602 A1* | 5/2018 | Spitzer | G02B 27/2228 |
| 2018/0192058 A1* | 7/2018 | Chen | G06T 11/60 |

* cited by examiner

PROCESSING METHOD AND PROCESSING DEVICE FOR DISPLAY DATA, AND DISPLAY DEVICE

CROSS REFERENCE TO RELATED APPLICATIONS

This U.S. non-provisional patent application claims priority under 35 U.S.C. § 119 to Chinese patent application No. 201810171542.3 filed on Mar. 1, 2018, the entire disclosure of which is incorporated herein by reference.

TECHNICAL FIELD

The disclosure relates to the field of data transmission technology, and in particular, to a processing method and processing device for display data, and a display device.

BACKGROUND

A virtual reality (VR) device generally includes a host and a display. As the requirements of a VR product for the resolution and the refresh rate are higher and higher, data transmission between the application processing apparatus and the display driving apparatus for driving the display in the host will be greatly challenged, and an insufficient data transmission bandwidth may form a display tearing phenomenon, which will greatly affect the user experience. The existing schemes have an adverse effect on the high-fidelity display requirement.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. In addition, the claimed subject matter is not limited to implementations that solve any or all of the noted disadvantages in any section of the disclosure.

One aspect of the disclosure provides a processing method for display data applied in a computing device, which includes: determining a region of interest in the display area of the computing device; compressing data of an image in the display area; and transmitting data of an image of the region of interest and the compressed image data in the display area.

In an embodiment, the compressing data of an image in the display area comprises compressing data of an image of a non-interest region other than the region of interest in the display area.

In an embodiment, the compressing data of an image in the display area comprises compressing data of the entire image of the display area.

In an embodiment, the compressing data of an image in the display area comprises compressing data of the image in the display area to make row pixel number of the compressed image data in the display area to be less than or equal to that of the image of the region of interest.

In an embodiment, the method further includes the following step: adjusting row pixel numbers of both the compressed image in the display area and the image of the region of interest to be consistent by supplementing a first predetermined value at the end of each row of pixels of the image with the fewer row pixel number.

In an embodiment, the compressing data of an image in the display area comprises setting the data of the compressed image in the display area to be a second predetermined value, to identify that the data needs no processing.

In an embodiment, the region of interest is a human eye gaze region.

Another aspect of the disclosure provides a processing method for display data applied in a computing device, which includes: obtaining data of the image of the region of interest and compressed image data in the display area; decompressing the compressed image data in the display area; merging the data of the image of the region of interest and decompressed image data in the display area, to form data of the image to be displayed; and transmitting the data of the image to be displayed to the display panel of the computing device for display.

In an embodiment, what is obtained by the decompression is an image of a non-interest region other than the region of interest in the display area of the display panel.

In an embodiment, what is obtained by the decompression is the data of the entire image of the display area in the display panel.

In an embodiment, the merging comprises substituting the data of the image of the region of interest for a corresponding part of the decompressed entire image data of the display area to form the data of the image to be displayed.

In an embodiment, the method further includes removing a first predetermined value in response to detection that the end of a row of pixels of one of the compressed image in the display area and the image of the region of interest is the first predetermined value.

In an embodiment, in response to the compressed image data in the display area being a second predetermined value identifying that the data needs no processing, the decompressed image data in the display area of a previous, frame is utilized for merging with the data of the image of the region of interest, to form the data of the image to be displayed.

A still another aspect of the disclosure provides a processing device for display data applied in a computing device, which includes: a memory configured to store an instruction; and a processor configured to execute the instruction to implement any method as described above.

A yet another aspect of the disclosure provides a processing method for display data including any processing method for display data as provided by the one aspect of the disclosure and any processing method for display data as provided by the another aspect of the disclosure.

A yet still another aspect of the disclosure provides a display device including a processing device implementing any processing method for display data provided according to the another aspect of the disclosure and a display panel.

DETAILED DESCRIPTION

Figure 1:
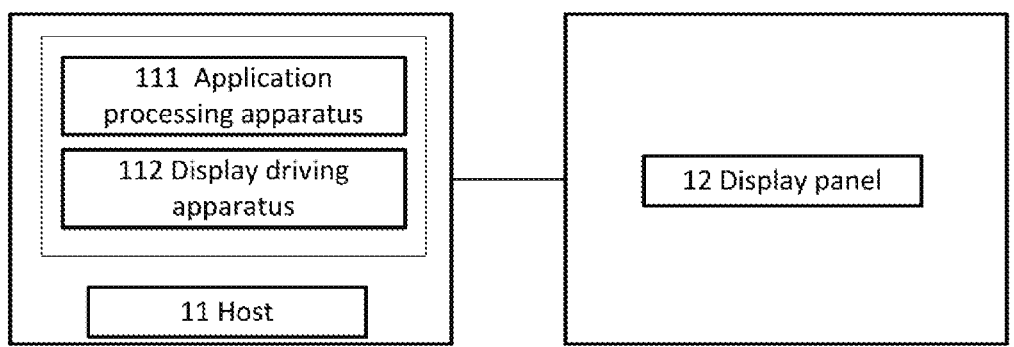
FIG. 1 illustrates a block diagram of a system according to the disclosure.

In the following the implementation process of the embodiments of the invention will be described in detail in conjunction with the drawings of the specification. It needs to be noted that, identical or similar reference signs denote identical or similar elements or elements that have identical or similar functions throughout. In the following, the embodiments described with reference to the drawing are exemplary, only used for explaining the invention, and can not be construed as limiting the invention.

In a related scheme, the data at the application processing apparatus side is compressed according to the DSC (display stream compression) standard, decompressed accordingly inside the display driving apparatus and then outputted for display. Another scheme is such that the application processing apparatus side transmits a low resolution image primarily compressed in a way of scaling down to the display driving apparatus, pixel number recovery is performed inside the display driving apparatus, and it is outputted for display after scaling up.

First, with reference to FIG. 1, FIG. 1 illustrates a block diagram of a system according to the disclosure. A computing device, for example, virtual reality device, includes a host 11 and a display panel 12, wherein the host 11 includes an application processing apparatus 111 and a display driving apparatus 112. The host 11 is mainly responsible for various data calculation and processing, for example a fixed device, or located in the cloud; and the display panel 12 may be planar or arc-shaped, for example, integrated in a head-mounted apparatus, to present for example virtual reality display to a user. The application processing apparatus 111 generates image data required for being displayed to the user by performing an application. The display driving apparatus 112 converts the image data displayed to the user into data to be displayed by the display panel and outputs it to the display panel.

Figure 2:
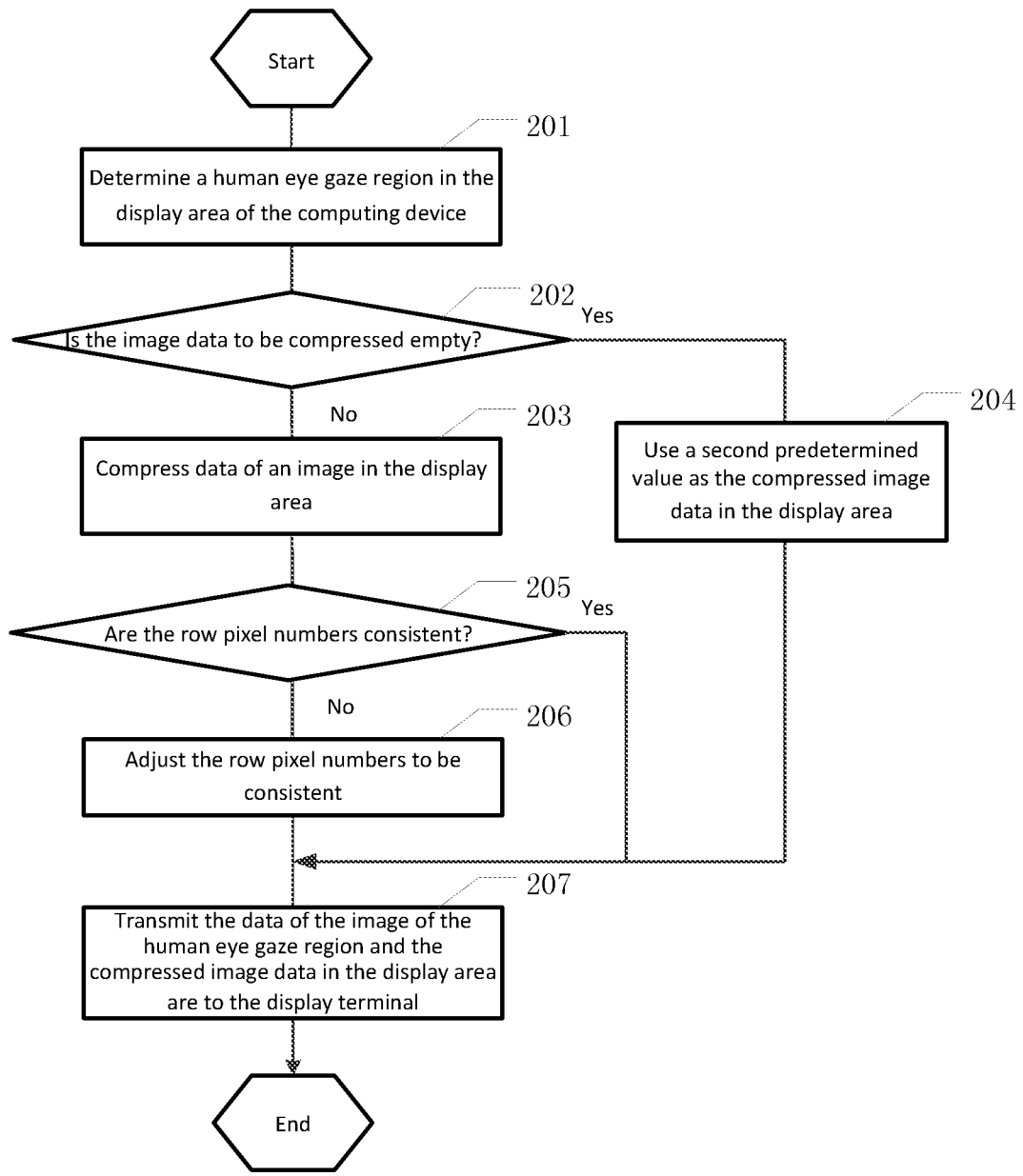
FIG. 2 illustrates a flow chart of a method according to some embodiments of the disclosure.

FIG. 2 illustrates a flow chart of a method applied in the application processing apparatus 111 according to some embodiments of the disclosure. At step 201, the application processing apparatus 111 determines a human eye gaze region in the display area of the computing device. On the computing device may be arranged a gaze sensor (not shown), via which information on human eye gaze is obtained, thereby determining the human eye gaze region in the display area of the display panel 12 of the computing device. The human eye gaze region may for example be a region within a certain range centered on a human eye gaze point, for example, a rectangular region, and the gaze sensor may for example obtain the position of the gaze point of the human eyes on the display panel. The size of the gaze region may be set to be a certain size, for example, the length and the width are a half, or a quarter, etc. of the length and width of the display area of the display panel, respectively.

At step 203, data of an image in the display area is compressed. In an example, the data of the image to be compressed is data of an image of a non-gaze region other than the human eye gaze region in the display area, that is, data of an image of a non-gaze region other than the human eye gaze region in the display area is compressed. Such an approach may more reduce the data to be transmitted and save the bandwidth, but the processing of the image data is relatively more troublesome. Maybe it is necessary to divide the image of the non-gaze region other than the human eye gaze region into several (possibly different sized) pieces for compression, and maybe the compression ratio of each piece will further be different. Moreover, it is necessary to negotiate such a processing approach between the application processing apparatus 111 and the display driving apparatus 112, in order that different pieces all can be correctly decompressed at the display driving apparatus 112. In another example, the data of the image to be compressed is the data of the entire image of the display area, that is, all the image data of the display area is compressed. As compared to the previous example in which only the image data of the non-gaze region is compressed, the compression processing of this example is simpler, and only one-time compression is needed to be performed for the entire image.

At step 207, data of an image of the human eye gaze region and the compressed image data in the display area are transmitted together, for example, to the display driving apparatus 112. Advantageously, the data of the image of the human eye gaze region and the compressed image data in the display area need to follow a certain format, in order that the display driving apparatus 112 obtaining them can correctly parse. In a first format example, the compression ratio may be appropriately adapted, such that the row pixel number of the compressed image data in the display area is equal to that of the data of the image of the human eye gaze region. At this point, the data of the image of the human eye gaze region and the compressed image data in the display area may be directly spliced together in the column direction to be transmitted to the display driving apparatus 112. In a second format example, the compression ratio may be appropriately adapted, such that the row pixel number of the compressed image data in the display area is less than that of the data of the image of the human eye gaze region. At this point, the row pixel number of the compressed image data in the display area may be complemented, to be equal to that of the data of the image of the human eye gaze region, and then the data of the image of the human eye gaze region and the compressed image data in the display area are spliced together in the column direction to be transmitted to the display driving apparatus 112. Both the two examples reduce the data transmission bandwidth requirement as much as possible under the premise of guaranteeing the high quality transmission of the image data of the human eye gaze region, which is extremely beneficial especially for high resolution, high refresh rate and/or large amount of data. Of course, in another format example, the compression ratio may further be suitably adapted, such that the row pixel number of the compressed image data in the display area is more than that of the data of the image of the human eye gaze region. At this point, the row pixel number of the data of the image of the human eye gaze region may be complemented, to be equal to that of the compressed image data in the display area, and then the data of the image of the human eye gaze region and the compressed image data in the display area are spliced together in the column direction to be transmitted to the display driving apparatus 112. Clearly, the data transmission bandwidth requirement of such an approach is not reduced as much as possible, however, it also has an advantage, for example, the compression ratio is reduced and the compression loss is appropriately reduced.

In the above various format examples, the pixel values employed by the complement are a predetermined value, here, designated by a first predetermined value, which may for example be successive "0". For example, the row pixel numbers of both the compressed image and the image of the human eye gaze region are adjusted to be consistent by supplementing the first predetermined value at the end of each row of pixels of the image with the fewer row pixel number. With respect to that there may be a format example of different row pixel numbers, at step 205, it is judged whether the row pixel number of the data of the image of the human eye gaze region is identical to that of the compressed image data in the display area, and if no, it is necessary to adjust them to be identical for example according to the above format examples at step 206. Here, "spliced" means being simply put together as a big data block. For example, the first N rows of pixel values are the data of the image of the human eye gaze region, and the immediate next M rows of pixel values are the compressed image data in the display area. Of course, it may also be implemented such that the data of the image of the human eye gaze region and the compressed image data in the display area are transmitted successively and independently, or transmitted via different ports simultaneously and independently.

There exists such a case in which the relative change of the images of a previous frame and a next frame is not great, for example, in a relatively still video, or in a video in which the non-gaze region is relatively still, or in a video in which the non-gaze region is not important. When such a case is detected at step 202, it may be possible not to update the non-gaze region. In an example, only the image data of the gaze region is transmitted, that is, the data of the image to be compressed is empty, which may greatly reduce the transmission bandwidth requirement, is extremely advantageous especially for high resolution, high refresh rate and/or a large amount of data, and meanwhile, may reduce the compression load of the application processing apparatus 111 and the decompression load of the display driving apparatus 112 especially for a display panel with a large viewing angle. In another example, some data is still transmitted, such that the display driving apparatus 112 can normally recognize image data of the same size, without needing extra signaling to communicate with the application processing apparatus 111, thereby reducing the system complexity. The data may be set such that it has the same amount of data and format as it is normally compressed. For example, at step 204, the used content of the data may be set to be a predetermined value, here, designated by a second predetermined value, which may be set to be the same as or different from the first predetermined value. For example, it may be "0", of which the purpose is such that the display driving apparatus 112 when obtaining the predetermined value, can judge that the data needs no processing, to identify the data, namely, it needs no decompression, needs no merging, needs no display, or the like, when obtaining the predetermined values. As such, although the transmission bandwidth requirement cannot further be reduced as the previous example, the compression load of the application processing apparatus 111 and the decompression load of the display driving apparatus 112 may still be reduced.

Figure 3:
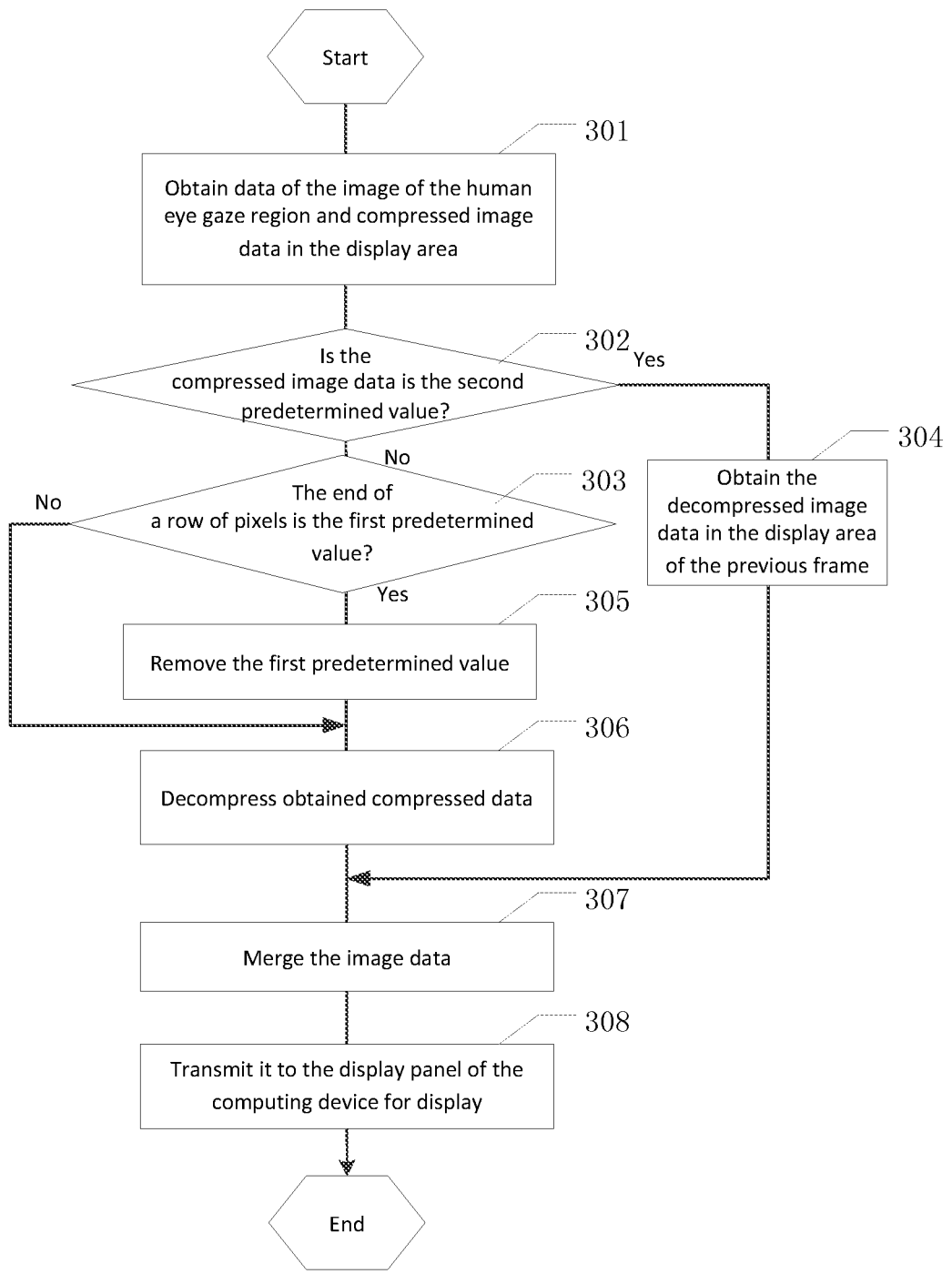
FIG. 3 illustrates a flow chart of another method according to some embodiments of the disclosure.

FIG. 3 illustrates a flow chart of a method applied in the display driving apparatus according to some embodiments of the disclosure. The way in which the method is described corresponds to that of FIG. 2. At step 301, the display driving apparatus 112 obtains data of an image of a human eye gaze area and compressed image data in a display area. The obtaining may be receiving via an interface between the application processing apparatus 111 and the display driving apparatus 112, may be receiving via some other intermediate apparatus, or may be read from some storage apparatus, and the like. At step 306, the display driving apparatus 112 decompresses compressed image data in the display area. In an example, what is obtained by the decompression is an image of a non-gaze region other than the human eye gaze region in the display area of the display panel. Such an approach may more reduce the data to be transmitted and save the bandwidth, but the processing of the image data is relatively more troublesome. The image of the non-gaze region other than the human eye gaze region may have been divided into several (possibly different sized) pieces for compression, and maybe the compression ratio of each piece will further be different. This requires that different pieces all can be correctly decompressed at the display driving apparatus 112 accordingly. In another example, what is obtained by the decompression is the data of the entire image of the display area in the display panel 12. As compared to the previous example, the decompression processing of this example is simpler, and only one-time decompression is needed to be performed for the obtained entire image of a fixed size.

Advantageously, as described in connection with FIG. 2, the data of the image of the human eye gaze region and the compressed image data in the display area follow a certain format, and accordingly, the display driving apparatus 112 obtaining them needs to be able to correctly parse them. For example, in the above first format example, the row pixel number of the compressed image data in the display area is equal to that of the data of the image of the human eye gaze region, and both are directly spliced together without being added predetermined row pixels, and transmitted to the display driving apparatus 112. At this point, it is unnecessary to remove any predetermined row pixel. In the second format example, the row pixel number of the compressed image data in the display area is less than that of the data of the image of the human eye gaze region. After the row pixel number of the compressed image data in the display area is complemented with predetermined row pixels, it is then spliced together with the data of the image of the human eye gaze region and transmitted to the display driving apparatus 112. In another format example, the row pixel number of the compressed image data in the display area is more than that of the data of the image of the human eye gaze region. After the row pixel number of the data of the image of the human eye gaze region is complemented with predetermined row pixels, it is then spliced together with the compressed image data in the display area and transmitted to the display driving apparatus 112. For the examples in which there may be predetermined pixels, at step 303, it is necessary to judge whether there is a row pixel of a predetermined value for complement at the end of each row of pixels of the compressed image data in the display area or at the end of each row of pixels of the image data of the human eye gaze region. If yes, it is necessary to remove the row pixel of the predetermined value at step 305, that is, when it is detected that the end of a row of pixels of one of the compressed image or the image of the human eye gaze region is the first predetermined value, the first predetermined value is removed, and then subsequent processing is performed.

Corresponding to the step of using a predetermined value as the compressed image data in the display area described in connection with FIG. 2, when it is detected at step 302 that the compressed image data in the display area is the predetermined value indicative of needing no processing, that is, when the compressed image data in the display area is the second predetermined value identifying that the data needs no processing, for example, all the row pixels are "0", then the decompressed image data in the display area of a previous frame is obtained at step 304, without needing the decompression processing of the step 306, and the second predetermined value may be discarded directly.

After the data of the image of the human eye gaze region is obtained from the obtained spliced (or otherwise sent successively and independently or simultaneously and independently, for example) data of the image of the human eye gaze region and data of the compressed image, and the decompressed image data in the display area is obtained from the step 306, or the decompressed image data in the display area of the previous frame is obtained from the step 304, at step 307, the display driving apparatus 112 merges the obtained data of the image of the human eye gaze region and the decompressed image data in the display area obtained at the step 306 or the decompressed image data in the display area of the previous frame obtained from the step 304, to form the image data to be displayed. The way of merging is related with the way of determining the data to be compressed in the application processing apparatus. If the data of the image to be compressed is the data of the image of the non-gaze region other than the human eye gaze region in the display area, then the way of merging is to splice the data of the image of the human eye gaze region and the decompressed image data in the display area obtained at the step 306 or the decompressed image data in the display area of the previous frame obtained from the step 304 according to pixel coordinates. If the data of the image to be compressed is the data of the entire image of the display area, then the way of merging is to substitute the data of the image of the human eye gaze region for image data at corresponding coordinates in the decompressed image data in the display area obtained at the step 306 or the decompressed image data in the display area of the previous frame obtained from the step 304, to form the data of the image to be displayed. It is obvious that the two images being merged, that is, the image of the human eye gaze area and decompressed image in the display area apply the same frame of reference for their pixel coordinates.

At step 308, the display driving apparatus 112 transmits the data of the image to be displayed to the display panel of the computing device for display.

Since the data of the image of the gaze region is not compressed and decompressed and the transmission loss is basically negligible, lossless display of the gaze region may be implemented.

The approach of data processing in connection with FIG. 3 corresponds to the approach of data processing in connection with FIG. 2, and it may be appreciated by the person having skills in the art that the correspondence of settings may be implemented between the application processing apparatus 111 and the display driving apparatus at the time of system initialization, or also the correspondence of settings may be implemented by inputting an instruction after the system is started.

The above steps in connection with FIG. 2 and FIG. 3 may be performed with respect to the image of each frame, and some steps, for example, the step 201 of determining the human eye gaze region in the display area of the computing device, may also be performed once every few frames in combination with the physiological limit of the human eye rotation speed.

The various embodiments described in connection with FIG. 3 and the various corresponding embodiments described in connection with FIG. 2 have the same or corresponding beneficial effects, which will not be repeated here any longer.

The method described in connection with FIG. 2 and the method described in connection with FIG. 3 together constitute a method applied in the host 11.

Figure 4A:
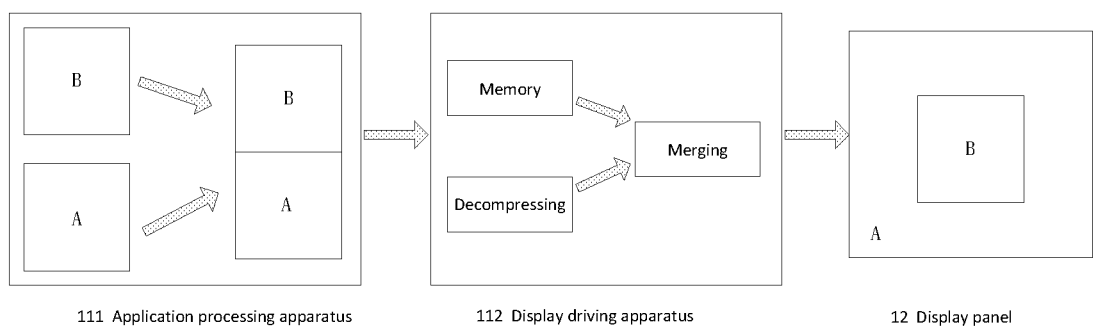
FIG. 4a illustrates a schematic diagram of processing of image data according to some embodiments of the disclosure.

FIG. 4a illustrates a schematic diagram of processing of image data according to some embodiments of the disclosure. As shown in FIG. 4a, B is the data of the image of the determined human eye gaze region, which is raw data, and A is the data of the image of the non-gaze region after the data is compressed by the application processing apparatus 111. Inside the application processing apparatus 111, A and B may be spliced into complete data C of a fixed size, and then outputted to the display driving apparatus 112. The data B is recognized and outputted to the memory of the display driving apparatus 112, for example, RAM, and the data B is merged with the data A after the data A is decompressed, wherein the approach of merging refers to what is described above in connection with FIG. 3, and then outputted to the display panel for display. Of course, as is well known to the person having skills in the art, various post-processing may further be performed before display, for example, color adjustment, etc., which will not be repeated here any longer. Taking that the interface between the application processing apparatus 111 and the display driving apparatus 112 is a MIPI interface (i.e., Mobile Industry Processor Interface) as an example, the transmission rate of the MIPI D-PHY is typically 1 Gbps/lane, and since each port has 4 lanes, the transmission bandwidth is 4 Gbps. However, the transmission rate of the C-PHY is typically 2.28 Gbps/lane, and since each port has 3 lanes, the transmission bandwidth is 6.84 Gbps. The communication resolution between the application processing apparatus 111 and the display driving apparatus 112 is X*Y, the transmission is performed at a frame frequency f, and the total amount of data is X*Y*f*24 bit (an RGB pixel needs 24 bits)*(1+Porch)/1000000000 G, wherein Porch represents blank period coefficient. Taking that the resolution is 4K (actually 4320) 4K (actually 4800), the frame frequency is 90 Hz, and Porch is 0.2 as an example, the total amount of data is 4320*4800*90*24*1.2/1000000000=53.75G (note: here 4K is just an abbreviation, both 4320 and 4800 may be referred to as 4K for short, and the calculation is based on the actual number of pixels). Therefore, the D-PHY or C-PHY cannot be used for transmission. If, according to an embodiment of the disclosure, suppose that the resolution of the human eye gaze region is 1K (1080) 1K (1200), the non-gaze region is compressed into the same 1K (1080) 1K (1200), Porch is still 0.2, and then transmission is performed through data of 1K2K spliced in the application processing apparatus 111, the required total amount of data transmission is 1080*2400*90*24*1.2/1000000000=6.72G, and the D-PHY or C-PHY 2 port may be used for transmission, which greatly reduces the transmission bandwidth, and is extremely advantageous especially for high resolution, high refresh rate and/or a large amount of data. Since the amount of transmitted data decreases sharply, this also saves the power consumption of data transmission at the same time. Since the data of the image of the gaze region is not compressed and decompressed, and the transmission loss is basically negligible, lossless display of the gaze region may be realized.

In some embodiments, the application processing apparatus 111 may be a graphics processing unit (GPU), which may be integrated in a central processing unit (CPU) or exist independently.

Figure 4B:
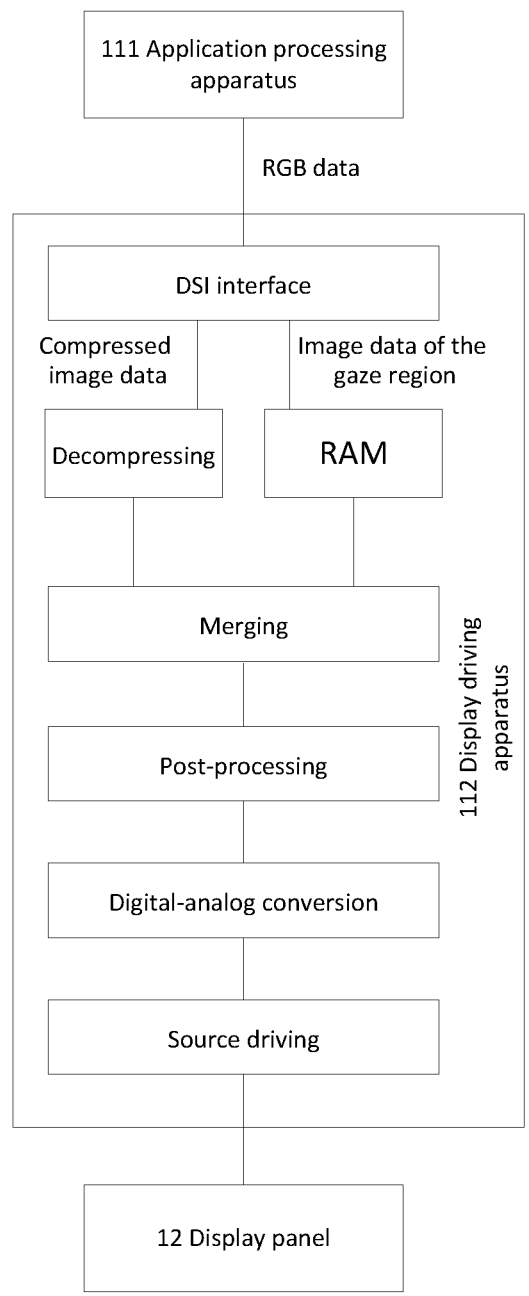
FIG. 4b illustrates another schematic diagram of processing of image data according to some embodiments of the disclosure.

FIG. 4b illustrates another schematic diagram of processing of image data according to some embodiments of the disclosure. The application processing apparatus 111 transmits the data obtained according to the above embodiments to the display driving apparatus 112, which data is generally RGB data. After obtaining the data via its DSI interface, the display driving apparatus 112 recognizes the data of the image of the gaze region and the compressed image data in the display area according to a predetermined rule. In an example, the approach of compression of the compressed image data in the display area is to remove a pixel, for example, remove one row of pixels every four rows, thereby obtaining data with a low resolution, and accordingly, the approach of decompression of the compressed image data in the display area is to add a pixel, for example, once one row is obtained, three rows are copied, and thereby four rows are recovered. The data of the image of the gaze region is raw data and directly stored in the memory, for example, a RAM, especially a static RAM. After the data of the image of the gaze region and the compressed image data in the display area are merged (the specific approach of merging refers to what is described above with reference to FIG. 3), post-processing may be performed to adjust pixels, for example, edge sharpening, making bright pixels brighter, or adjust the mixing ratio of RGB, or adjust the color temperature, or the like. Afterwards, it may be possible to perform digital-analog conversion and generate a source driving signal, which is finally sent to the data line of the display panel 12. It is known to the person having skills in the art that processing of image data may be performed per row or per several rows, and therefore buffering may be performed via a row buffer before and after each step.

Figure 5:
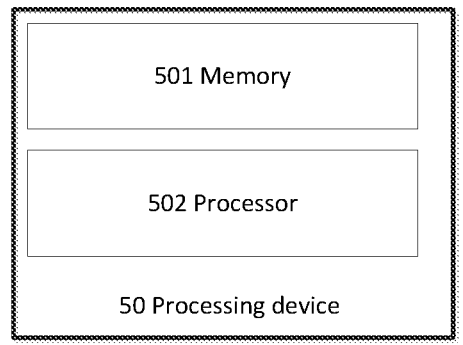
FIG. 5 illustrates a block diagram of a hardware device according to some embodiments of the disclosure.

FIG. 5 illustrates a block diagram of a hardware device according to some embodiments of the disclosure. The hardware device shown in FIG. 5 is adapted to the application processing apparatus 111 and the display driving apparatus 112. The hardware device includes a memory 501 and a processor 502, the memory 501 is configured to store instructions, and the processor 502 is configured to execute the instructions to implement the various steps described above in connection with FIG. 2 or FIG. 3. For example, the processor may be a universal central processor CPU, and the CPU is caused to perform functions of a controller by connecting a related component to the bus of the CPU or inputting related instructions to the CPU or reading corresponding instructions and data. For example, the processor may be a dedicated processor, e.g., a single chip microcomputer CPU, a programmable logic array FPGA, an application-specific integrated circuit, a digital processor DSP, etc. which is designed for the purpose of performing functions including those described above, and it is caused to performing functions of the controller by connecting a related component to a pin of the dedicated processor or inputting related instructions to the dedicated processor or reading corresponding instructions and data. For example, the processor may be an integrated circuit IC in which an operational instruction set of functions of the various related circuits, to implement the functions of the various related circuits with a high efficiency and low power consumption. The memory 501 and the memory in FIG. 4a include any storage medium capable of storing data (including instructions). The memory may be external, internal, or include a component external and internal to the processing device, may include a volatile medium (such as a random access memory (RAM)) and/or non-volatile medium (such as a read-only memory (ROM), a flash memory, a compact disc, a magnetic disk, etc.), and may include a fixed medium (e.g., a RAM, a ROM, a fixed hard driver, etc.) and a removable medium (e.g., a flash memory driver, a removable hard driver, a compact disc, etc.).

Figure 6:
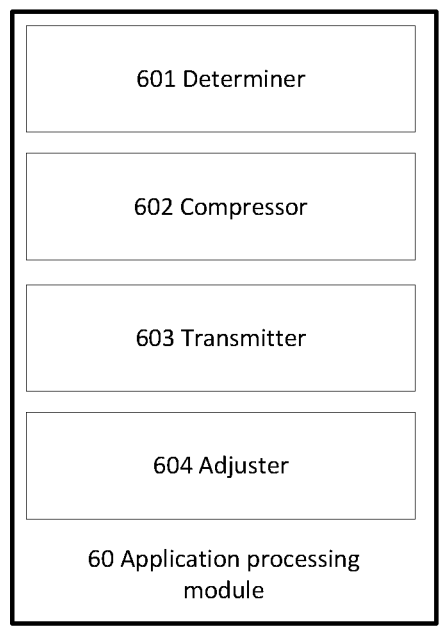
FIG. 6 illustrates a block diagram of an application processing apparatus according to some embodiments of the disclosure.

FIG. 6 illustrates a block diagram of an application processing module according to some embodiments of the disclosure. As shown in FIG. 6, the application processing module 60 includes a determiner 601, a compressor 602 and a transmitter 603.

The determiner 601 is configured to determine a human eye gaze region in the display area of the computing device. On the computing device may be arranged a gaze sensor (not shown), via which information on human eye gaze is obtained, and the determiner 601 determines the human eye gaze region in the display area of the display panel 12 of the computing device in response to obtaining of the information. The human eye gaze region may for example be a region within a certain range, centered on a human eye gaze point, for example, a rectangular region, and the gaze sensor may for example obtain the position of the gaze point of the human eyes on the display panel. The size of the gaze region may be set to be a certain size, for example, the length and the width are a half, or a quarter, etc. of the length and width of the display area of the display panel, respectively.

The compressor 602 is configured to compress data of an image in the display area. In an example, the data of the image to be compressed is data of an image of a non-gaze region other than the human eye gaze region in the display area, that is, data of an image of a non-gaze region other than the human eye gaze region in the display area is compressed. Such an approach may more reduce the data to be transmitted and save the bandwidth, but the processing of the image data is relatively more troublesome. Maybe it is necessary to divide the image of the non-gaze region other than the human eye gaze region into several (possibly different sized) pieces for compression, and maybe the compression ratio of each piece will further be different. Moreover, it is necessary to negotiate such a processing approach between the application processing module 60 and the display driving module 70, in order that different pieces all can be correctly decompressed at the display driving module 70. In another example, the data of the image to be compressed is the data of the entire image of the display area, that is, all the image data of the display area is compressed. As compared to the previous example in which only the image data of the non-gaze region is compressed, the compression processing of this example is simpler, and only one-time compression is needed to be performed for the entire image.

The transmitter 603 is configured to transmit the image of the human eye gaze region and the compressed image data in the display area to the display terminal of the computing device.

Further, the application processing module 60 further include an adjuster configured to adjust the row pixel numbers of both the compressed image in the display area and the image of the human eye gaze region to be consistent by supplementing a first predetermined value at the end of each row of pixels of the image with the fewer row pixel number. Advantageously, the data of the image of the human eye gaze region and the compressed image data in the display area need to follow a certain format, in order that the display driving module 70 obtaining them can correctly parse. In a first format example, the compression ratio may be appropriately adapted, such that the row pixel number of the compressed image data in the display area is equal to that of the data of the image of the human eye gaze region. At this point, the transmitter 603 may directly splice the data of the image of the human eye gaze region and the compressed image data in the display area together in the column direction to be transmitted to the display driving module 70. In a second format example, the compression ratio may be appropriately adapted, such that the row pixel number of the compressed image data in the display area is less than that of the data of the image of the human eye gaze region. At this point, the row pixel number of the compressed image data in the display area may be complemented via the adjuster 604, to be equal to that of the data of the image of the human eye gaze region, and then the data of the image of the human eye gaze region and the compressed image data in the display area are spliced together in the column direction to be transmitted to the display driving module 70. Both the two examples reduce the data transmission bandwidth requirement as much as possible under the premise of guaranteeing the high quality transmission of the image data of the human eye gaze region, which is extremely beneficial especially for high resolution, high refresh rate and/or large amount of data. Of course, in another format example, the compression ratio may further be suitably adapted, such that the row pixel number of the compressed image data in the display area is more than that of the data of the image of the human eye gaze region. At this point, the row pixel number of the data of the image of the human eye gaze region may be complemented via the adjuster 604, to be equal to that of the compressed image data in the display area, and then the data of the image of the human eye gaze region and the compressed image data in the display area are spliced together in the column direction to be transmitted to the display driving module 70. Clearly, the data transmission bandwidth requirement of such an approach is not reduced as much as possible, however, it also has an advantage, for example, the compression ratio is reduced and the compression loss is appropriately reduced. In the above various format examples, the pixel values employed by the adjuster 604 in the complement are a predetermined value, as described above in connection with FIG. 2, called a first predetermined value, which may for example be successive "0". With respect to that there may be a format example of different row pixel numbers, it is judged whether the row pixel number of the data of the image of the human eye gaze region is identical to that of the compressed image data in the display area, and if no, it is necessary for the adjuster 604 to adjust them to be identical for example according to the above format examples. Here, "spliced" means being simply put together as a big data block. For example, the first N rows of pixel values are the data of the image of the human eye gaze region, and the immediate next M rows of pixel values are the compressed image data in the display area. Of course, it may also be implemented such that the data of the image of the human eye gaze region and the compressed image data in the display area are transmitted successively and independently, or transmitted via different ports simultaneously and independently.

There exists such a case in which the relative change of the images of a previous frame and a next frame is not great, for example, in a relatively still video, or in a video in which the non-gaze region is relatively still, or in a video in which the non-gaze region is not important. When such a case is detected, it may be possible not to update the non-gaze region. In an example, the transmitter 603 transmits only the image data of the gaze region, that is, the data of the image to be compressed is empty, which may greatly reduce the transmission bandwidth requirement, is extremely advantageous especially for high resolution, high refresh rate and/or a large amount of data, and meanwhile, may reduce the compression load of the application processing module 60 and the decompression load of the display driving module 70 especially for a display panel with a large viewing angle. In another example, the transmitter 603 still transmits some data, such that the display driving module 70 can normally recognize image data of the same size, without needing extra signaling to communicate with the application processing module 60, thereby reducing the system complexity. The data may be set such that it has the same amount of data and format as it is normally compressed. For example, the content of the data may be set to be a predetermined value, as described above in connection with FIG. 2, called a second predetermined value, which may be set to be the same as or different from the first predetermined value. For example, it may be "0", of which the purpose is such that the display driving module 70 can judge that the data needs no processing, namely, it needs no decompression, needs no merging, needs no display, or the like, when obtaining the predetermined values. As such, although the transmission bandwidth requirement cannot further be reduced as the previous example, the compression load of the application processing module 60 and the decompression load of the display driving module 70 may still be reduced.

Figure 7:
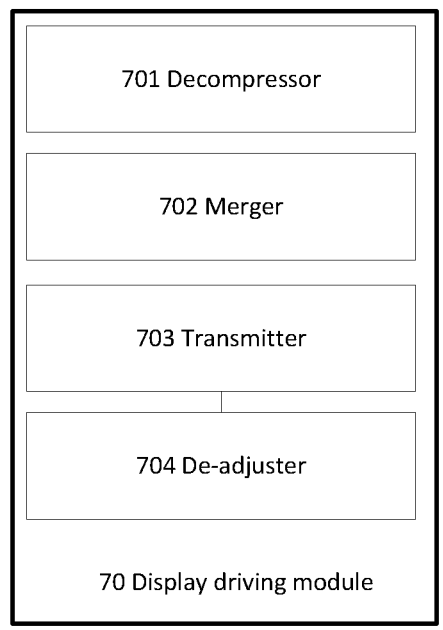
FIG. 7 illustrates a block diagram of a display driving apparatus according to some embodiments of the disclosure.

FIG. 7 illustrates a block diagram of a display driving module according to some embodiments of the disclosure. As shown in FIG. 7, the display driving module 70 includes a decompressor 701, a merger 702 and a transmitter 703, wherein the decompressor 701 is configured to decompress compressed image data in the display area. In an example, what is obtained by the decompression is an image of a non-gaze region other than the human eye gaze region in the display area of the display panel. Such an approach may more reduce the data to be transmitted and save the bandwidth, but the processing of the image data is relatively more troublesome. The image of the non-gaze region other than the human eye gaze region may have been divided into several (possibly different sized) pieces for compression, and maybe the compression ratio of each piece will further be different. This requires that different pieces all can be correctly decompressed at the display driving apparatus 112 accordingly. In another example, what is obtained by the decompression is the data of the entire image of the display area in the display panel 12. As compared to the previous example, the decompression processing of this example is simpler, and only one-time decompression is needed to be performed for the obtained entire image of a fixed size.

The display driving module 70 further includes a de-adjuster 704 configured to remove the first predetermined value when it is detected that the end of a row of pixels of one of the compressed image or the image of the human eye gaze region is the first predetermined value. Advantageously, as described in connection with FIG. 6, in an embodiment, the data of the image of the human eye gaze region and the compressed image data in the display area have been adjusted by the adjuster 604, and accordingly, the de-adjuster 704 of the display driving module 70 obtaining them needs to be able to correctly parse them. For example, in the above first format example, the row pixel number of the compressed image data in the display area is equal to that of the data of the image of the human eye gaze region, and both are directly spliced together without being added predetermined row pixels, and transmitted to the display driving module 70. At this point, it is unnecessary to remove any predetermined row pixel. In the second format example, the row pixel number of the compressed image data in the display area is less than that of the data of the image of the human eye gaze region. After the row pixel number of the compressed image data in the display area is complemented with predetermined row pixels, it is then spliced together with the data of the image of the human eye gaze region and transmitted to the display driving module 70. In another format example, the row pixel number of the compressed image data in the display area is more than that of the data of the image of the human eye gaze region. After the row pixel number of the data of the image of the human eye gaze region is complemented with predetermined row pixels, it is then spliced together with the compressed image data in the display area and transmitted to the display driving module 70. For the examples in which there may be predetermined pixels, the de-adjustment module detects and removes the row pixel of the predetermined value, that is, when it is detected that the end of a row of pixels of one of the compressed image or the image of the human eye gaze region is the first predetermined value, the first predetermined value is removed, and then subsequent processing is performed.

Corresponding to that the transmitter 603 uses a predetermined value as the compressed image data in the display area described in connection with FIG. 6, when the display processing module 70 detects that the compressed image data in the display area is the predetermined value indicative of needing no processing, that is, when the compressed image data in the display area is the second predetermined value identifying that the data needs no processing, for example, all the row pixels are "0", then the decompressed image data in the display area of a previous frame is obtained, without needing the decompression processing of the decompressor 701, and the second predetermined value may be discarded directly.

The merger 702 is configured to merge obtained data of an image of the human eye gaze region and the decompressed image data in the display area, to form data of the image to be displayed. For example, after the data of the image of the human eye gaze region is obtained from the obtained spliced (or otherwise sent successively and independently or simultaneously and independently, for example) data of the image of the human eye gaze region and data of the compressed image, and the decompressed image data in the display area is obtained from the decompressor 701, or the decompressed image data in the display area of the previous frame is obtained, the merger 702 merges the obtained data of the image of the human eye gaze region and the decompressed image data in the display area obtained in the decompressor 701 or the obtained decompressed image data in the display area of the previous frame, to form the image data to be displayed. The way of merging is related with the way of determining the data to be compressed in the application processing module 60. If the data of the image to be compressed is the data of the image of the non-gaze region other than the human eye gaze region in the display area, then the way of merging is to splice the data of the image of the human eye gaze region and the decompressed image data in the display area obtained in the decompressor 701 or the obtained decompressed image data in the display area of the previous frame according to pixel coordinates. If the data of the image to be compressed is the data of the entire image of the display area, then the way of merging is to substitute the data of the image of the human eye gaze region for image data at corresponding coordinates in the decompressed image data in the display area obtained in the decompressor 701 or the obtained decompressed image data in the display area of the previous frame, to form the data of the image to be displayed.

The transmitter 703 is configured to transmit the data of the image to be displayed to the display panel of the computing device for display. Since the data of the image of the gaze region is not compressed and decompressed and the transmission loss is basically negligible, lossless display of the gaze region may be implemented.

The display driving module 70 in connection with FIG. 7 corresponds to the application processing module 60 in connection with FIG. 6, and it may be appreciated by the person having skills in the art that the correspondence of functions may be implemented between the display driving module 70 and the application processing module 60 at the time of system initialization, or also the correspondence of functions may be implemented by inputting an instruction after the system is started.

The various embodiments described in connection with FIG. 7 and the various corresponding embodiments described in connection with FIG. 6 have the same or corresponding beneficial effects, which will not be repeated here any longer.

Figure 8:
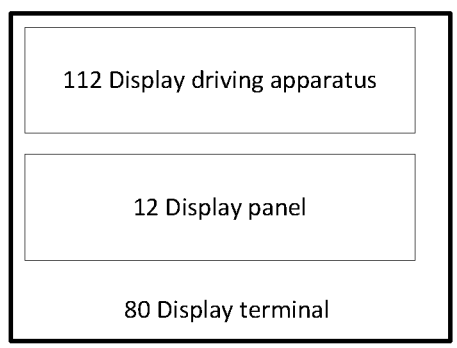
FIG. 8 illustrates a block diagram of a display terminal according to some embodiments of the disclosure.

The display driving apparatus 112 and the display panel 12 shown in FIG. 1 are collectively called the display terminal 80, namely, the display device, as shown in FIG. 8.

A display device provided by the disclosure includes a processing device and a display panel, the processing device including:

at least one memory configured to store instructions; and
at least one processor configured to execute the instructions to implement the following steps:
decompressing compressed image data in the display area;
merging obtained data of the image of the human eye gaze region and the decompressed image data in the display area, to form data of the image to be displayed; and
transmitting the data of the image to be displayed to the display panel of the computing device for display.

The beneficial effects of the embodiment of the disclosure have been elucidated in detail in conjunction with specific embodiments, which will not be repeated here any longer.

It is noted that although the present disclosure is described with reference to human eye gaze region, it is noted that the present invention is not limited to it, but applicable to other regions of interest similarly, and those embodiments are definitely covered by the present invention.

It may be appreciated by the person having skills in the art that an appended drawing is just a schematic diagram of one embodiment, and the module(s) or flow chart in the drawing is not necessarily essential to implementation of the invention.

It may be appreciated by the person having skills in the art that modules in an apparatus in an embodiment may be distributed in the apparatus of the embodiment according to the description of the embodiment, or also may change accordingly to be located in one or more apparatus different from the embodiment. The modules of the embodiment may be combined into one module, or also may further be split into multiple sub-modules.

Clearly, various modifications and variations may be made to the invention by the skilled in the art without departing from the spirit and scope of the invention. As such, the invention is also intended to include these modifications and variations, if the modifications and variations of the invention pertain to the scope of the claims of the invention and the equivalent thereof.

What is claimed is:

1. A processing method for display data applied in a computing device, comprising:
   determining a region of interest in a display area of the computing device;

compressing first data of a first image in the display area to obtain compressed image data in the display area; and transmitting second data of a second image in the region of interest and the compressed image data in the display area;

the method further comprising:

adjusting the first row pixel number of the compressed image in the display area and the second row pixel number of the second image in the region of interest to be consistent by supplementing a first predetermined value at an end of each row of pixels of one of the first image or the second image that has a fewer row pixel number.

2. The processing method as claimed in claim 1, wherein the compressing the first data of the first image in the display area comprises:

compressing the first data of the first image in a non-interest region that is separate from the region of interest in the display area.

3. The processing method as claimed in claim 1, wherein the compressing the first data of the first image in the display area comprises:

compressing an entire image of the display area to obtain the first data.

4. The processing method as claimed in claim 1, wherein the compressing the first data of the first image in the display area comprises:

compressing the first data of the first image in the display area such that a first row pixel number of the compressed image data in the display area is less than or equal to a second row pixel number of the second image in the region of interest.

5. The processing method as claimed in claim 1, wherein the compressing the first data of the first image in the display area comprises:

setting the compressed image data in the display area to a second predetermined value to identify that the compressed image data needs no processing.

6. The processing method as claimed in claim 1, wherein the region of interest comprises a human eye gaze region.

7. A processing device for the display data applied in a computing device, comprising:

a memory configured to store one or more instructions; and a processor configured to execute the one or more instructions to implement operations of claim 1.

8. The processing device as claimed in claim 7, wherein the compressing the data of the first image in the display area comprises:

compressing the data of the first image in a non-interest region that is separate from the region of interest in the display area.

9. The processing device as claimed in claim 7, wherein the compressing the data of the first image in the display area comprises:

compressing an entire image of the display area to obtain the data of the first image in the display area.

10. A processing method for display data applied in a computing device, the processing method comprising:

obtaining data of a first image in a region of interest and compressed image data in a display area;

decompressing the compressed image data in the display area to obtain decompressed image data;

merging the data of the first image in the region of interest and the decompressed image data in the display area, to form the display data of the second image to be displayed; and transmitting the display data of the second image to be displayed to a display panel of the computing device for display;

wherein the method further comprises:

removing a first predetermined value in response to detection that the end of a row of pixels of one of the compressed image and the first image in the region of interest is the first predetermined value.

11. The processing method as claimed in claim 10, wherein the decompressed image data is associated with a third image in a non-interest region that is separate from the region of interest in the display area of the display panel.

12. The processing method as claimed in claim 10, wherein the decompressed image data is associated with an entire image of the display area in the display panel.

13. The processing method as claimed in claim 12, wherein the merging comprises:

substituting the data of the first image in the region of interest for a corresponding part of the decompressed image data associated with the entire image of the display area to form the display data of the second image to be displayed.

14. The processing method as claimed in claim 10, wherein the decompressed image data comprises first decompressed image data, and wherein in response to the first decompressed image data in the display area being a second predetermined value identifying that the first decompressed image data does not need processing, second decompressed image data in a previous frame is utilized for merging with the data of the first image in the region of interest, to form the display data of the second image to be displayed.

15. The processing method of claim 10, wherein the region of interest comprises a human eye gaze region, and wherein the merging the data of the first image in the region of interest and the decompressed image data comprises:

merging the data of the image in the human eye gaze region and decompressed image data in the display area, to form the display data of the image to be displayed.

16. A processing device for display data, characterized by being applied in a computing device, comprising:

a memory configured to store one or more instructions; and a processor configured to execute the one or more instructions to implement operations of claim 10.

17. The processing device as claimed in claim 16, wherein what is obtained by the decompressing the compressed image data is an image of a non-interest region other than the region of interest in the display area of the display panel.

18. The processing device as claimed in claim 16, wherein the decompressed image data is associated with an entire image of the display area in the display panel.

19. A display device, including a processing device and a display panel, the processing device comprising:

at least one memory configured to store instructions; and at least one processor configured to execute the instructions to implement operations comprising:

obtaining data of a first image of a region of interest and compressed image data in a display area;

decompressing the compressed image data in the display area to obtain decompressed image data;

merging the data of the first image in the region of interest and the decompressed image data in the display area, to form display data of the second image to be displayed; and transmitting the display data of the second image to be displayed to the display panel of the display device for display;

wherein the operations further comprise:

removing a first predetermined value in response to detection that the end of a row of pixels of one of the compressed image and the first image in the region of interest is the first predetermined value.

* * * * *